Patented Jan. 9, 1934

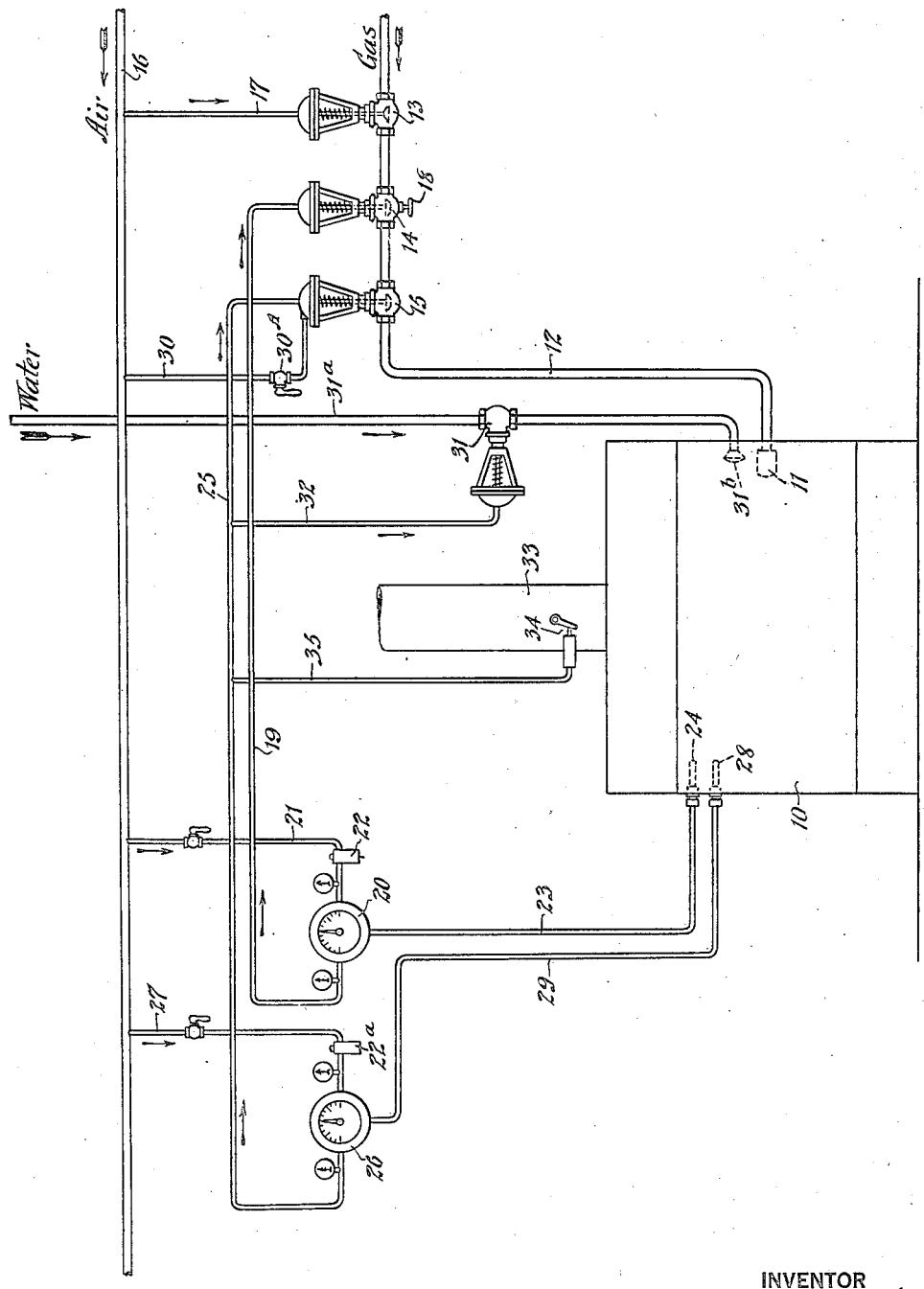

UNITED STATES PATENT OFFICE 1,943,211

1,943,211

METHOD FOR ROASTING COFFEE

Edward J. Dent, Montclair, N. J., assignor to American Coffee Corporation, Brooklyn, N. Y., a corporation of New York Application January 20, 1931. Serial No. 510,038

4 Claims. (Cl. 99—11)

This is a division in part of the patent application which was filed in the United States Patent Office on April 1st, 1930 under Serial No. 440,804.

An object of the invention is to provide a method of roasting coffee in which the coffee is subjected to heat at a roasting temperature and the supply of heat is discontinued when a predetermined temperature is reached which indicates that the roasting period has been completed. Preferably the supply of heat is reduced at a predetermined temperature and the supply of heat is discontinued at a predetermined higher temperature which indicates that the roasting period has been completed.

Another object of the invention is to provide a method of roasting coffee in which the roasting period is determined by the temperature at the coffee.

Still another object of the invention is to spray the coffee with a fluid, which is preferably water, at the predetermined temperature which indicates that the roasting period has been completed.

Additional objects of the invention will appear in the following specification in which the preferred form of the invention is described.

The drawing illustrates diagrammatically the apparatus which is preferably used in carrying out the method.

With the method of roasting coffee which is the subject matter of this application, the roasting period is determined by the temperature at the coffee, the coffee being normally disposed in a roaster, which at the commencement of the first roasting period is at atmospheric temperature which may be in the neighborhood at 70° Fahrenheit, but it will be understood that the roaster, after the completion of the first roasting period and at the commencement of the second roasting period, will be at a higher temperature, which may be as high as 190° Fahrenheit, and that when the roaster is in continuous use the commencement of subsequent roasting periods may be at even higher temperatures.

When the coffee is deposited in the roaster it is subjected to heat at a roasting temperature and thermally responsive means are provided for reducing the supply of heat when the temperature at the coffee reaches a predetermined point, depending on the character of the roast which is desired, and other conditions. In practice it has been found advisable to reduce the supply of gas, with which the roaster is normally heated, when the temperature at the coffee reaches from 300° to 375° Fahrenheit. Very good results may be obtained when the supply of gas is reduced at a temperature of 367° Fahrenheit. It has been found to be advisable to reduce the supply of gas at this point in the roasting period to approximately thirty percent of the original flow, or a reduction of approximately seventy percent, the reduction in the supply of gas varying with reference to the character of the coffee roast desired. When the supply of gas is reduced as the temperature at the coffee reaches 367° Fahrenheit, the interval between the turning on of the gas and the reduction in the supply of gas will be from about fourteen minutes and forty-five seconds to about fifteen minutes and five seconds. However it will be understood that this period may vary, not only with reference to the gas pressure and the character of the coffee which is being roasted but also because of the moisture in the atmosphere and with regard to the temperature of the roaster at the commencement of the roasting period. This reduction in the supply of gas to the roaster is not sufficient to reduce the temperature at the coffee, for on the contrary, the temperature will slowly rise, even after the gas supply has been reduced, until it reaches a point indicating that the roasting period is completed and the roasted coffee should be wetted. While in practice the supply of gas is cut off and the coffee is wetted at a temperature of 388° Fahrenheit, it will be understood that this temperature may vary, as, for instance, when French after dinner coffee is desired, which is customarily referred to as a French roast, in which case the supply of gas may be cut off at a somewhat higher temperature. It has been found to be advisable to cut off the supply of gas between 380° to 410° Fahrenheit, but in most cases the supply of gas is cut off at approximately 388° Fahrenheit.

In most cases the time during which the gas is turned on for a roasting period is from seventeen minutes and forty seconds to seventeen minutes and forty-five seconds, and during this time the heat is at a roasting temperature for approximately sixteen minutes.

In carrying out the method an apparatus, such as the apparatus illustrated diagrammatically in the drawing, may be used. In this apparatus the coffee roaster is indicated at 10 and may be of any conventional type, a gas burner 11 being illustrated which supplies heat for roasting the coffee. Preferably an agitating apparatus is provided within the roaster for agitating the coffee beans during the roasting period.

A gas supply main 12 is provided for supplying gas to the burner 11 to roast the coffee, there being control valves 13, 14 and 15 in this gas supply main. As a means for controlling the valves an air pressure supply line 16 is provided which is directly connected through a pipe 17 with the valve 13 which, as will be seen by referring to the drawing, is a reverse-acting valve, the requirements being such that when the pressure in the air pressure supply line 16 falls below a predetermined level the valve 13 will be closed, thus closing the supply of gas to the gas burner 11. It will be understood that the valve 13 and the pipe 17 are used as a safety provision and should there be any failure of the valves 14 and 15 to function due to lack of pressure, the valves 13 will function, thereby eliminating all danger.

The valve 14 is a direct-acting valve for reducing the flow of gas to the gas burner 11 during the roasting period. The complete closure of this valve 14 is prevented by an adjustable pin 18, the adjustment of which will determine the exact amount of gas flow when the valve 14 is operated. Air from the supply main 16 is delivered to the valve 14 through a supply pipe 19 which leads from a direct set regulator 20 which is supplied from the air pressure supply line 16 through a pipe 21 and through an air strainer 22. As a means for controlling the supply of air to the control valve 14, the direct set regulator 20 is connected by a pipe 23 with a mercury bulb 24 mounted within the coffee roaster 10. This bulb 24 is provided with mercury in the usual manner, the arrangement being such that as the temperature of the roaster increases, the mercury will expand, thus supplying a pressure through the pipe 23 to the direct set regulator 20, which is adjusted to open the supply of pressure from the main 16 through the pipe 19 to the valve 14 at a predetermined temperature at the roaster. At such time the valve 14 will be operated to partially shut off the supply of gas to the burner.

For completely shutting off the supply of gas to the burner 11 on the completion of the roasting period, the valve 15 is provided. This valve 15 is air-supplied through a pipe 25 which leads from a second direct set regulator 26, air being supplied to the said regulator 26 through a pipe 27 leading from the air pressure supply line 16, the regulator 26 being operated by a mercury bulb 28 mounted within the roaster 10, as is the mercury bulb 24. A pipe 29 leads from this bulb 28 to the direct set regulator 26 for the operation thereof. It should be clearly understood that the direct set regulator 26 is adjusted to operate at a temperature higher than that set for the operation of the direct set regulator 20. It will be seen that an air strainer 22ª is provided in the pipe 27 which is similar to the air strainer 22 in the pipe 21.

In the roasting operation the reduction of the supply of gas during the roasting period is not sufficient to lower the temperature in the roaster, for the temperature increases even after this reduction of the supply of gas takes place on the operation of the bulb 14. Preferably the supply of gas is reduced to approximately thirty percent of the original flow, or a reduction of approximately seventy percent, as set forth above, and this reduction of the supply of gas takes place at a temperature, for instance, of 367° Fahrenheit. When the temperature in the roaster has reached a higher point, as, for instance, a temperature of 388° Fahrenheit, the roasting period is completed and the gas is shut off entirely by the means described at the valve 15.

At times it may be desired to shut off manually the gas supply to the gas burner 11, as, for instance, when the apparatus is to be left idle, and with this in mind a supply pipe 30 is provided which leads to the valve 15 from the air pressure supply line 16, communication through this pipe 30 being controlled by a manual valve 30ª. It will be understood that when the apparatus is to be shut down the valve 30ª may be opened, whereby pressure may be supplied from the air pressure supply line 16 for retaining the valve 15 in closed position.

It is advantageous to deliver water to the coffee after the final temperature has been achieved and the roasting period has been completed, and a reverse acting water valve 31 is provided which is connected through a pipe 32 with the pipe 25 so that when the valve 15 is closed the water valve 31 will be opened to permit a predetermined quantity of water to pass through the pipe 31ª to the sprayer 31ᵇ in the coffee roaster 10.

An outlet 33 leads from the coffee roaster 10 and this outlet 33 is controlled by a damper (not shown) which is operated by a pressure-operated device 34 which is connected by a pipe 35 with the pipe 25. By this arrangement it will be seen that when the pressure is supplied through the pipe 25, not only will the valve 15 be closed, but the valve 31 will be opened to deliver water to the roaster and the damper in the outlet 33 will be opened to permit the discharge of steam from the coffee roaster.

What is claimed is:—

1. The method of roasting coffee consisting in subjecting coffee during the roasting period in a roaster to a continually rising temperature beginning at approximately a roasting temperature and continuing until the temperature of the roaster reaches a predetermined relatively higher degree, and thereafter continuing to roast the coffee in the roaster at a more slowly rising temperature until a predetermined higher temperature of the coffee is reached indicating that the roasting has been completed when the supply of heat is discontinued.

2. The method of roasting coffee consisting in subjecting coffee during the roasting period in a roaster to a continually rising temperature beginning at approximately a roasting temperature and continuing until the temperature of the roaster reaches a predetermined relatively higher degree between 300° and 375° Fahrenheit, and thereafter continuing to roast the coffee in the roaster at a more slowly rising temperature until a predetermined higher temperature of the coffee is reached indicating that the roasting has been completed when the supply of heat is discontinued.

3. The method of roasting coffee consisting in subjecting coffee during the roasting period in a roaster to a continually rising temperature beginning at approximately a roasting temperature and continuing until the temperature of the roaster reaches a predetermined relatively higher degree between 300° and 375° Fahrenheit, and thereafter continuing to roast the coffee in the roaster at a more slowly rising temperature until a predetermined higher temperature of the coffee is reached between 380° and 410° Fahrenheit, indicating that the roasting has been completed when the supply of heat is discontinued.

4. The method of roasting coffee, consisting in subjecting coffee during the roasting period in a roaster to continually rising temperature beginning at approximately a roasting temperature and continuing for a period of approximately fifteen minutes when a predetermined temperature of the coffee is reached between 300° and 375° Fahrenheit, and thereafter continuing to roast the coffee in the roaster for a short period at a more slowly rising temperature until a predetermined temperature is reached between 380° and 410° Fahrenheit when the roasting period is completed and the supply of heat discontinued.

E. J. DENT.